(12) United States Patent
Onizuka et al.

(10) Patent No.: US 9,490,504 B2
(45) Date of Patent: Nov. 8, 2016

(54) NON-AQUEOUS ELECTROLYTE SECONDARY BATTERY, AND MANUFACTURING METHOD THEREOF

(75) Inventors: Hiroshi Onizuka, Toyota (JP); Tomohiro Nakano, Okazaki (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 389 days.

(21) Appl. No.: 14/352,493

(22) PCT Filed: Sep. 10, 2012

(86) PCT No.: PCT/JP2012/073041
§ 371 (c)(1),
(2), (4) Date: Apr. 17, 2014

(87) PCT Pub. No.: WO2013/058033
PCT Pub. Date: Apr. 25, 2013

(65) Prior Publication Data
US 2014/0308578 A1    Oct. 16, 2014

(30) Foreign Application Priority Data
Oct. 18, 2011  (JP) .................................. 2011-228691

(51) Int. Cl.
| *H01M 10/0567* | (2010.01) |
| *H01M 10/052* | (2010.01) |
| *H01M 10/058* | (2010.01) |
| *H01M 2/02* | (2006.01) |
| *H01M 2/30* | (2006.01) |
| *H01M 10/0525* | (2010.01) |

(52) U.S. Cl.
CPC .......... *H01M 10/058* (2013.01); *H01M 2/024* (2013.01); *H01M 2/305* (2013.01); *H01M 10/052* (2013.01); *H01M 10/0567* (2013.01); *H01M 10/0525* (2013.01); *H01M 2220/20* (2013.01); *H01M 2300/0025* (2013.01); *Y02E 60/122* (2013.01); *Y02P 70/54* (2015.11); *Y02T 10/7011* (2013.01); *Y10T 29/49108* (2015.01)

(58) Field of Classification Search
None
See application file for complete search history.

(56) References Cited

U.S. PATENT DOCUMENTS

| 2004/0259000 A1* | 12/2004 | Adachi | ............. H01M 10/0525 429/306 |
| 2011/0104564 A1* | 5/2011 | Matsui | ................ H01M 4/0445 429/199 |

FOREIGN PATENT DOCUMENTS

JP    2005-32712    2/2005

* cited by examiner

*Primary Examiner* — Ula C Ruddock
*Assistant Examiner* — Matthew Van Oudenaren
(74) *Attorney, Agent, or Firm* — Finnegan, Henderson, Farabow, Garrett & Dunner, LLP

(57) ABSTRACT

A lithium secondary battery 100 is configured such that an electrode body 20, in which a cathode and an anode are stacked via a separator impregnated with an electrolyte, is housed in a battery case 10 having a substantially cylindrical square shape and that an opening 12 of the case 10 is blocked by a lid 14. Further, the lid 14 is provided with a cathode terminal 38 and an anode terminal 48, and such terminals are respectively connected, inside the battery case 10, to an internal cathode collection terminal 37 and an internal anode collection terminal 47. A non-aqueous electrolyte used for the lithium secondary battery 100 contains, as a specific compound, for example, LiBOB, and an initial content of such specific compound relative to a capacitance of the anode is 0.04 to 0.5 [(mol/kg)/(mF/cm$^2$)].

6 Claims, 7 Drawing Sheets

NON-AQUEOUS ELECTROLYTE SECONDARY BATTERY, AND MANUFACTURING METHOD THEREOF

TECHNICAL FIELD

The present invention relates to a non-aqueous electrolyte secondary battery for a vehicle drive power source.

BACKGROUND ART

In recent times, sustained performance effected over a longer period than ever is required for non-aqueous electrolyte secondary batteries, such as lithium (ion) secondary batteries, which are used for drive power sources (on-vehicle power source) for vehicles, such as hybrid vehicles, electric vehicles and fuel cell vehicles. Thus, in order to suppress the deterioration of a battery capacity to improve the cycle characteristics and high rate characteristics, the addition of boron-containing lithium salt, such as lithium bis(oxalato) borate ($Li[B(C_2O_4)_2]$; the so-called LiBOB), phosphorus-containing lithium salt, such as lithium difluorobis(oxalato) phosphate ($Li[PF_2(C_2O_4)_2]$; the so-called LPFO) or an appropriate carbonate compound to a non-aqueous electrolyte has been being employed widely.

For example, Patent Document 1 discloses a lithium secondary battery comprising a non-aqueous electrolyte containing boron-containing lithium salt, which is referred to as LBFO in the same document, at a predetermined concentration in the solution or at a predetermined molar ratio with respect to an electrolyte ($LiPF_6$).

PRIOR ART REFERENCE

Patent Document

Patent Document 1: JP2005-032712 A

SUMMARY OF THE INVENTION

Problem to be Solved by the Invention

It has been understood that the above-mentioned boron-containing lithium salt, for example, LiBOB, is reduced and decomposed on an anode during an initial charging of a lithium secondary battery from chemical species generated from such reaction, a coating consisting of a chemically stable compound (for example, a polymerization compound of LiBOB; see, for example, J. Power Sources 174 (2007) 400-407) is formed on the anode; and the occurrence of a reaction between a non-aqueous electrolyte and the anode is thereby suppressed during the operation (endurance operation) of the lithium secondary battery (However, the action mechanism is not limited to the above-described one).

Meanwhile, as disclosed in Patent Document 1, only defining the amount of boron-containing lithium salt to be added to a non-aqueous electrolyte by a concentration in the non-aqueous electrolyte or a molar ration relative to an electrolyte makes the chemical and/or physical relationship between an anode (anode active material), serving as a subject of the formation of a coating, and such formation of a coating unclear, and it is extremely difficult or impossible to optimize the amount of boron-containing lithium salt necessary for obtaining a coating which makes it possible to implement the sufficient protection of the anode.

In the case of using a non-aqueous electrolyte not containing boron-containing lithium salt in an amount necessary and sufficient to obtain a desired coating, there is naturally a possibility that an anode protecting effect and a capacity-deterioration suppressing effect would not be obtained sufficiently. On the other hand, in the case of using a non-electrolyte aqueous containing boron-containing lithium salt in an amount which exceeds the amount necessary and sufficient to obtain a desired coating, the material cost tends to increase unnecessarily, and this is not preferable from an economic viewpoint. Further, in the latter case, it is assumed from a stoichiometric viewpoint that a coating is formed preferably; however, contrary to expectations, it has been found according to the findings by the present inventors that it would not be difficult to obtain the initial anode protection effect and capacity-deterioration suppression effect.

Further, inferring the relationship with the physical properties of an anode as a subject of the formation of a coating, it may be possible to assume that the amount of addition of boron-containing lithium salt to a non-aqueous electrolyte is specified with respect to, for example, the BET specific surface area of an anode active material. However, as a result of intensive studies by the present inventors, no significant correlation has been found between the content of boron-containing lithium salt relative to the BET specific surface area of an anode active material and the above-described capacity-deterioration suppressing effect of a lithium secondary battery.

The present invention has been made in light of the above-stated circumstances, and an object of the present invention is to provide a non-aqueous electrolyte secondary battery for a vehicle drive power source which is capable of optimizing the amount of addition, with respect to a non-aqueous electrolyte, of an additive that expresses the anode protecting effect and the associated battery-capacity-deterioration suppressing effect and thereby further improving the cycle characteristics and durability and which is also capable of enhancing the economic efficiency with the use of a necessary and sufficient amount of additive and also to provide a method of manufacturing such non-aqueous electrolyte secondary battery.

Means for Solving the Problem

In order to solve the above problem, the present inventors have focused on a reaction mechanism of an additive in an anode of a non-aqueous electrolyte secondary battery and made repetitive intensive studies while paying attention, in particular, on the relationship between the reaction area, in the anode, of boron-containing lithium salt, such as LiBOB, and the physical properties of the anode and then reached the completion of the present invention.

That is, the non-aqueous electrolyte secondary battery according to the present invention is provided in a vehicle and is used as a power source for driving the vehicle, the non-aqueous electrolyte secondary battery comprising: a cathode containing a cathode active material; an anode containing an anode active material; and a non-aqueous electrolyte containing a lithium salt in a non-aqueous solvent, wherein the non-aqueous electrolyte further contains a compound represented by formula (1) below (hereinafter referred to as the "specific compound") and wherein, in the non-aqueous electrolyte, an initial content ratio of the compound relative to a capacitance of the anode is 0.04 to 0.5 [(mol/kg)/($mF/cm^2$)], preferably 0.05 to 0.25 [(mol/kg)/($mF/cm^2$)]. In the formula (1), M represents an element of the thirteenth, fourteenth or fifteenth group and another group may be bonded thereto depending on the valence; R represents $C_1$-$C_{10}$ alkylene, $C_1$-$C_{10}$ alkylene halide, $C_6$-$C_{20}$ arylene or $C_8$-$C_{10}$ arylene halide (a structure thereof may include a substituent and a hetero atom); and n represents 0 or 1. Regarding a measurement and evaluation method concerning an "anode capacitance," the description in the embodiments below should be referred to.

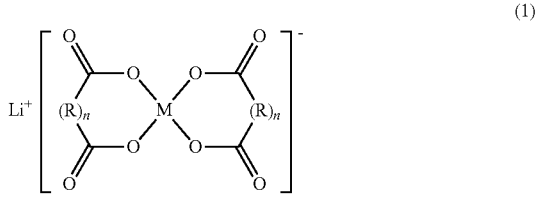

In the thus-configured non-aqueous electrolyte secondary battery, the specific compound of the formula (1) contained in the non-aqueous electrolyte is reduced and decomposed, on the anode, by the anode active material that acts as a strong reducing agent in a state-of-charge, and the produced chemical species having high activity bond to one another, resulting in the formation of a coating consisting of a chemically stable compound on the anode. Here, if the initial content ratio of the specific compound relative to the capacitance of the anode in the non-aqueous electrolyte has a value falling within the above-described range of 0.04 to 0.5 [(mol/kg)/(mF/cm$^2$)], the capacity maintenance factor can be held high during the operation of the non-aqueous electrolyte secondary battery. This has been confirmed by the present inventors.

Specifically, if the initial content ratio of the specific compound is less than 0.04 [(mol/kg)/(mF/cm$^2$)], it is difficult to grow a dense coating that functions as a sufficient physical barrier for the anode, and the protection of the anode thus tends to be insufficient. On the other hand, if the initial content ratio of the specific compound is above 0.5 [(mol/kg)/(mF/cm$^2$)], an unreacted (unreduced and undecomposed) specific compound is then captured in a coating under growth, and such unreacted specific compound then consumes an amount of electricity during the operation (endurance operation) of the non-aqueous electrolyte secondary battery, resulting in the possibility of the deterioration (decrease) of an apparent battery capacity. However, the effects are not limited to the above.

Further, the non-aqueous electrolyte secondary battery configured as above involves a preferred embodiment in which the capacitance of the anode is 0.09 (mF/cm$^2$) or higher, more preferably, 0.2 (mF/cm$^2$) or higher.

If the capacitance of the anode is below 0.09 (mF/cm$^2$), where the non-aqueous secondary battery is, for example, a lithium secondary battery, the number of sites that undergo the deinsertion of lithium ions in the anode active material is reduced to an inconvenient level, resulting in the possibility of an excessive increase of the resistance of reactions (including a battery reaction and a reduction reaction of a specific compound) in the anode.

Further, the method of manufacturing a non-aqueous electrolyte secondary battery according to the present invention is a method effective at obtaining the non-aqueous electrolyte secondary battery of the present invention and is also a method for manufacturing a non-aqueous electrolyte secondary battery that is provided in a vehicle and is used as a power source for driving the vehicle, the method comprising the steps of: forming or providing a cathode containing a cathode active material; forming or providing an anode containing an anode active material; and preparing a non-aqueous electrolyte containing a lithium salt in a non-aqueous solvent, wherein, in the step of preparing a non-aqueous electrolyte, the compound represented by the formula (1) above (regarding the symbols in the formula, the same as those stated above applies here) is added to the non-aqueous electrolyte such that an initial content ratio of the compound relative to a capacitance of the anode has a value falling within a range of 0.04 to 0.5 [(mol/kg)/(mF/cm$^2$)], preferably, 0.05 to 0.25 [(mol/kg)/(mF/cm$^2$)].

A more preferred embodiment in the above case is such that, in the step of forming or preparing an anode, the capacitance of the anode is preferably 0.09 (mF/cm$^2$) or higher, more preferably, 0.2 (mF/cm$^2$) or higher.

Effect of the Invention

According to the invention, the specific compound represented by the formula (1) is contained, at an initial content ratio within a predetermined range, in the non-aqueous electrolyte comprised in the non-aqueous electrolyte secondary battery; thus, a coating sufficient to protect the anode is formed, and a deterioration in the battery capacity due to an unreacted specific compound being captured in such coating can be prevented. In this way, the amount of addition of the specific compound to the non-aqueous electrolyte can be optimized, and as a result, the anode protecting effect due to the specific compound as well as the battery-capacity-deterioration suppressing effect can be expressed sufficiently. Therefore, the cycle characteristics as well as the durability of the non-aqueous electrolyte secondary battery can be improved, and further, the economic efficiency can be enhanced while suppressing an increase of the material cost.

BEST MODE FOR CARRYING OUT THE INVENTION

Figure 1:
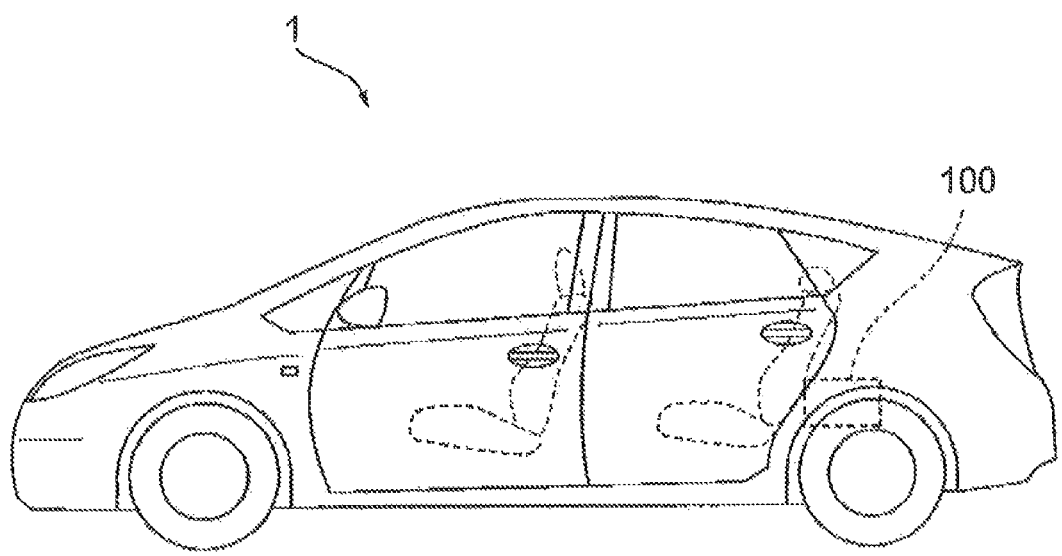
FIG. 1 is a schematic diagram illustrating a vehicle provided non-aqueous electrolyte secondary battery according to an embodiment of the present invention.

Embodiments of the present invention will be described in detail below. Note that positional relationships, such as top, bottom, right and left, are based on the positional relationships shown in the drawings unless otherwise indicated. In addition, dimensional ratios in the drawings are not limited to those shown. The embodiments below are merely examples for describing the present invention and are not intended to limit the present invention to those embodiments. Various modifications may be made to the present invention without departing from the gist of the Invention.

<Non-Aqueous Electrolyte Secondary Battery>

Figure 2:
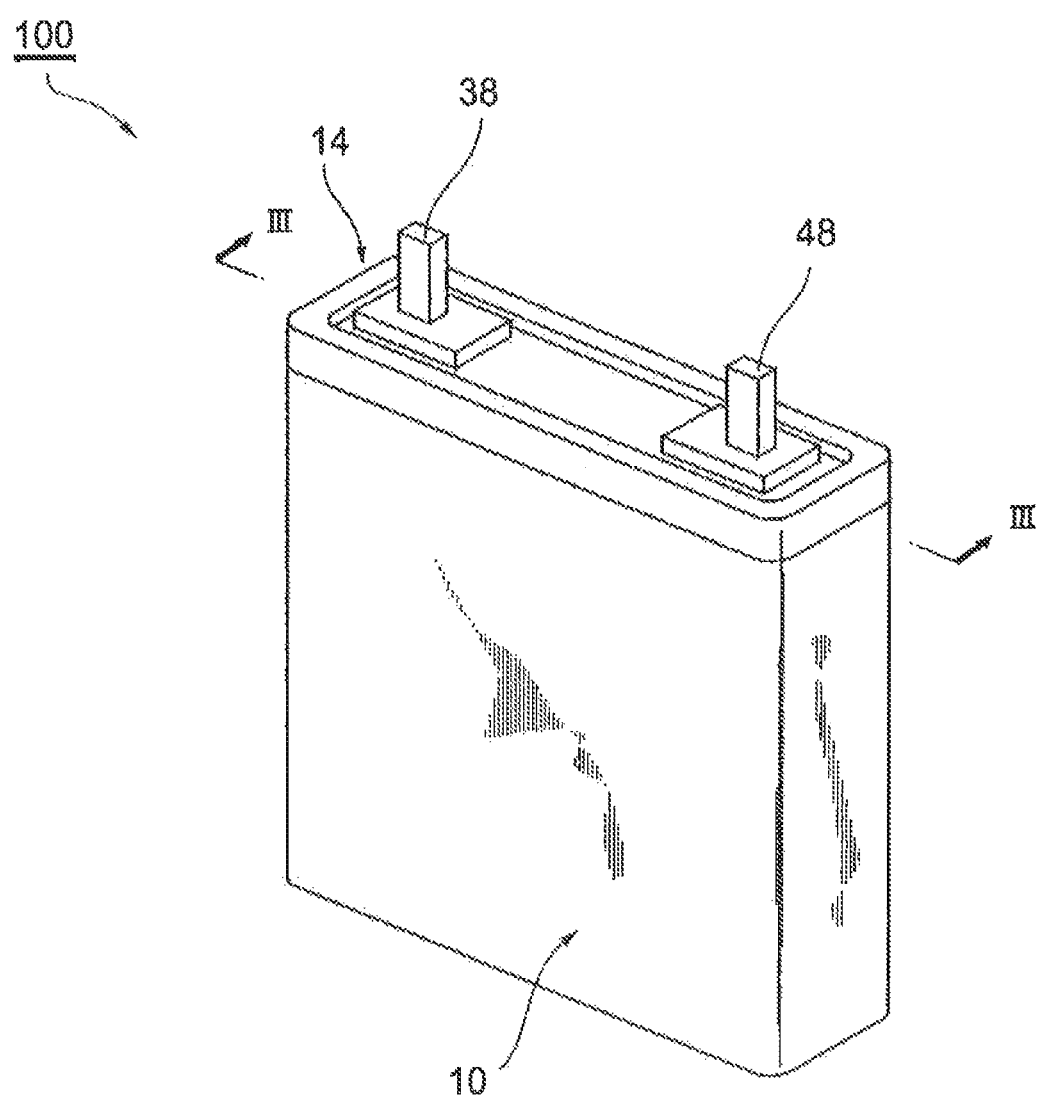
FIG. 2 is a perspective view schematically illustrating the configuration of the non-aqueous electrolyte secondary battery according to the present embodiment.
Figure 3:
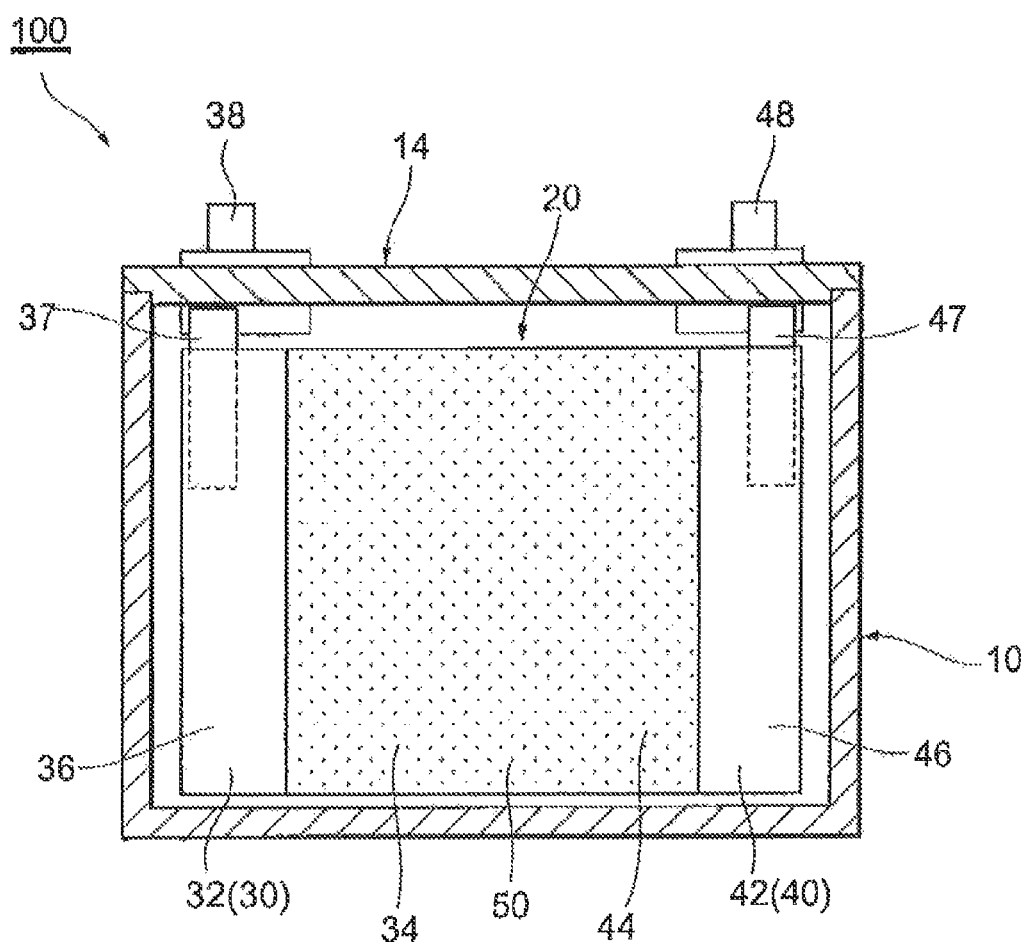
FIG. 3 is a cross-sectional view taken along line III-III in FIG. 2.

FIG. 1 is a schematic diagram illustrating a non-aqueous electrolyte secondary battery and a vehicle provided with such secondary battery according to an embodiment of the present invention. FIG. 2 is a perspective view schematically illustrating the configuration of the non-aqueous electrolyte secondary battery according to the present embodiment. FIG. 3 is a cross-sectional view taken along line III-III in FIG. 2.

As shown in FIG. 1, a lithium secondary battery 100 (non-aqueous electrolyte secondary battery) is mounted on a vehicle 1 (for example, a vehicle, in particular, a vehicles equipped with a motor, such as a hybrid vehicle, an electric vehicle or a fuel cell vehicle) and functions as a power source for driving the vehicle 1.

Further, as shown in FIGS. 2 and 3, the lithium secondary battery 100 has a structure in which: a battery case 10 having a substantially cylindrical square shape (rectangular parallelepiped shape) houses therein an electric body 20, such as a so-called wound-up (rolled-up) electrode body, which consists of a stack of a cathode and an anode which is provided therebetween with a separator impregnated with en electrolyte; and an opening 12 of the battery case 10 is blocked by a lid 14. Further, the lid 14 is provided with a cathode terminal 38 and an anode terminal 48 for external connection, and regarding the cathode terminal 38 and the anode terminal 48, parts of the respective upper ends thereof are provided to protrude from a surface of the lid 14, and parts of the respective lower ends thereof are connected, inside the battery case 10, to an internal cathode collection terminal 37 and an internal anode collection terminal 47.

Further, the electrode body 20 is configured such that a cathode sheet 30 comprised of, on a surface of a long cathode assembly (collector) 32, a cathode active material layer 34 and an anode sheet 40 comprised of, on a surface of a long anode assembly (collector) 42, an anode active material layer 44 are alternately stacked via a long-sheet shaped separator 50. This stack body is formed into a flat shape by, for example, crushing a wound-up electrode body, in the direction of a side surface thereof, which is obtained by coiling to have a tubular shape around a core (not shown) of the stack body.

Further, the above-described internal cathode collection terminal 37 and internal anode collection terminal 47 are respectively connected to a cathode-active-material-layer non-formation part 36 of the cathode assembly 32 and an anode-active-material-layer non-formation part 46 of the anode assembly 42 by an appropriate method, such as ultrasonic welding or resistance welding, and this establishes the electrical connection with the cathode sheet 30 and the anode sheet 40 in the electrode body 20.

The separator 50 is interposed between the cathode sheet 30 and the anode sheet 40 and is arranged so as to be brought into contact with both of the cathode active material layer 34 provided in the cathode sheet 30 and the anode active material layer 44 provided in the anode sheet 40. An electrolyte (non-aqueous electrolyte) is provided, through immersion, in holes formed in the separator 50, whereby a conductive path (an electrically conducting path) is defined between the cathode and the anode. It should be noted that the separator 50 has a width greater than that of the stack part of the cathode active material layer 32 and the anode active material layer 44 and smaller than that of the electrode body 20 and also that the separator 50 is provided to be sandwiched between the cathode active material layer 34 and the anode active material layer 44 of the stack part in order not to cause an internal short-circuit due to the contact between the cathode assembly 32 and the anode assembly 42.

As the constituent material for the separator 50, those known in the art may he used appropriately, and no particular limitation is placed on such constituent material. For example, a porous sheet consisting of a resin (microporous resin sheet) may be used preferably, and examples of the type of such resin may include polyolefin resins such polypropylene and polyethylene; and polystyrene. The separator 50 constituted by either a single layer (a single layer body) or a stack body of two layers or three or more layers may be used preferably.

(Cathode Sheet 30)

As a material for forming the cathode assembly 32, which serves as a base material of the cathode sheet 30, those known in the part may be used appropriately, and no particular limitation is placed on such material. Examples of such material include metals having excellent conductivity, such as aluminum and an alloy or composite metal containing, as its main constituent, aluminum.

The cathode active material layer 34 contains at least a cathode active material capable of occluding or releasing lithium ions serving as charge carriers. As such cathode active material, those known in the art may be used appropriately, and no particular limitation is placed on such material. Examples thereof may include a lithium transition-metal composite oxide comprising lithium (Li) and at least one kind of transition-metal element and having a layer structure or a spinel structure.

More specifically, examples of such material may include a cobalt lithium composite oxide ($LiCoO_2$); a nickel lithium composite oxide ($LiNiO_2$); a manganese lithium composite oxide ($LiMn_2O_4$); a so-called two-dimensional lithium transition-metal composite oxide, including two kinds of transition-metal elements, which is represented by $LiNi_xCo_{1-x}O_2$ ($0<x<1$) as a nickel cobalt composite oxide, $LiCo_xMn_{1-x}O_2$ ($0<x<1$) as a cobalt manganese composite oxide or $LiNi_xMn_{1-x}O_2$ ($0<x<1$) or $LiNi_xMn_{2-x}O_4$ ($0<x<2$) as a nickel manganese composite oxide; and a three-dimensional lithium transition-metal composite oxide, such as a nickel cobalt manganese composite oxide, including three kinds of transition-metal elements (for example, $LiNi_{1/3}Co_{1/3}Mn_{1/3}O_2$). It should be noted that each of the above lithium transition-metal composite oxides has a potential that falls within the range of approximately 3.5 V to 4.2 V (potential relative to a lithium reference voltage).

Further, a lithium transition-metal composite oxide may include, as micro-metal elements, one element or two or more elements selected from the group consisting of, for example, aluminum (Al), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La) and cerium (Ce).

As such above-described lithium transition-metal oxide, lithium transition-metal oxide powder prepared/provided by a conventional method may be used as it is, by way of example; alternatively, such lithium transition-metal oxide may be prepared by mixing, at a predetermined molar ratio, several starting materials appropriately selected in accordance with the atomic compositions and then calcining the resultant mixture by an appropriate means. It is also possible to crush, granulate and classify a calcined product by an appropriate means and thereby to obtain particulate lithium transition-metal oxide powder substantially constituted by secondary particles having a desired average particle diameter and/or particle size distribution.

Further, the cathode active material layer 34 may contain, as an additive, a self-sacrifice type auxiliary material which is decomposed through an oxidation reaction with an additive contained in the non-aqueous electrolyte described below with the discharging of the lithium secondary battery 100 and which enables the control of the amount of production of a coating to be produced, due to such oxidation reaction, on the surface of the cathode active material.

As such self-sacrifice type auxiliary material, it is possible to preferably use those each having a potential (a potential relative to a lithium reference electrode) lower than a potential (approximately 3.5 to 4.2 V) of the cathode active material cited above. Examples of such auxiliary material may include lithium-containing phosphate with an olivine structure, which is represented by the general formula $LiMPO_4$ (In the formula, M represents at least one kind or two or more kinds of transition-metal elements selected from the group consisting of Co, Ni, Mn and Fe,). Preferred examples of such olivine type lithium-containing phosphate may include lithium iron phosphate ($LiFePO_4$) and lithium manganese phosphate ($LiMnPO_4$) (a potential relative to a lithium reference voltage being approximately 3.2 to 3.8 V).

A combination of the above-described cathode active material and the above-described self-sacrifice type auxiliary material is not particularly limited as long as the relationship concerning a potential (a potential relative to a lithium reference voltage) between the cathode active material and the self-sacrifice type auxiliary material satisfies the inequality: cathode active material>self-sacrifice type auxiliary material. A preferred example of such combination may be obtained by using, as a cathode active material, $LiNi_{1/3}Co_{1/3}Mn_{1/3}O_2$ with a layer structure, and using, as a self-sacrifice type auxiliary material, $LiFePO_4$ with an olivine structure. Alternatively, a lithium transition-metal composite oxide with a layer structure may be used as a self-sacrifice type auxiliary material, and an example of the relevant combination may be obtained by using, as a cathode active material, $LiNn_2O_4$ with a spinel structure, which has a relatively high potential (approximately 4.2 V) and using, as a self-sacrifice type auxiliary material, $LiNiO_2$ with a layer structure, which has a potential higher than the above potential.

The cathode active material layer 34 may contain other components (optional components) known in the art, such as a conductive material and a binding material, if necessary. Examples of such conductive material may include conductive powder materials such as carbon powder and carbon fiber. Specific examples of carbon powder include various kinds of carbon black, such as acetylene black, furnace black, Ketjen black and graphite powder. Further, the cathode active material layer 34 may contain: conductive fibers such as carbon fibers and metal fibers; metal powders such as copper and nickel; and organic conductive materials such as a polyphenylene derivative, which may be used singly or as a mixture.

As a binding material, those known in the art may be used appropriately, and no particular limitation is placed on such binding material. Various kinds of polymer materials may be used preferably. More specifically, it is possible to selectively use a polymer capable of dissolving or dispersing in a solvent used for the production of the cathode active material layer 34. When a water-borne solvent is used, by way of example, it is possible to preferably use water-soluble or water-dispersible polymers including: cellulosic polymers such as carboxymethyl cellulose (CMC) and hydroxypropyl methylcellulose (HPMC); polyvinyl alcohol (PVA); fluororesins, such as polytetrafluoroethylene (PTFE) and a tetrafluoroethylene-hexafluoropropylene copolymer (FEP); a vinyl acetate copolymer; rubbers such as styrene-butadiene rubber (SBR) and an acrylic acid modified styrene-butadiene rubber resin (SBR latex). When a non-water-borne solvent used, it is possible to preferably employ polymers such as polyvinylidene difluoride (PVDF) and polyvinylidene chloride (PVDC). It should be noted that the various polymer materials indicated as examples may express the function of an additive such as a bodying agent besides the function of a binding material.

(Anode Sheet 40)

As a material for forming the anode assembly 42 serving as a base material of the anode sheet 40, those known in the art may be used appropriately, and no particular limitation is placed on such material. Examples of such material may include metals having excellent conductivity, such as copper and an alloy or composite metal containing, as its main constituent, copper.

The anode active material layer 40 contains at least an anode active material capable of occluding or releasing lithium ions serving as charge carriers. Such anode active material is a material that is decomposed through a reduction reaction with an additive contained in the non-aqueous electrolyte described below with the discharging of the lithium secondary battery and which enables the control of the amount of production of a coating to be produced, due to such reduction reaction, on the surface of the anode active material. Those conventionally used in the art for the above anode active material may be used without any particular limitation. Specific examples thereof include a particulate carbon material (carbon particles) at least partially comprising a graphite structure (layer structure). It is also possible to preferably use various carbon materials including: a so-called graphite material (graphite); a hard graphitized carbon material (hard carbon); a soft graphitized carbon material (soft carbon); a material having the structure of a mixture comprising the foregoing, etc.

From among the above, in particular, graphite particles such as graphite may be used preferably. Graphite particles have excellent conductivity since they are capable of preferably occluding lithium ions as charge carriers, and also have a small particle diameter and a large surface area per unit volume. Thus, such graphite particles have an advantageous point in that they may serve as an anode active material appropriate for high-rate pulse charging/discharging.

Further, the anode active material layer 44 may contain, as an additive, a self-sacrifice type auxiliary material which reduces and decomposes the above-mentioned additive with the charging of the lithium secondary battery 100 and which has a potential higher than a potential (potential relative to a lithium reference electrode) of the anode active material.

Examples of such self-sacrifice type auxiliary material may include an oxide or sulfide of a transition metal, such as titanium oxide or sulfide. More specific examples thereof may include lithium titanate, titanium oxide ($TiO_2$), titanium sulfide, tungsten oxide, molybdenum oxide, cobalt oxide and iron sulfide; a particularly preferred examples thereof is lithium titanate; and further preferred examples thereof may include $Li_{4+x}Ti_5O_{12}$ ($0 \leq x \leq 3$) and $Li_{2+x}Ti_3O_7$ ($0 \leq x \leq 3$).

Further, the anode active material layer 44 may contain other components (optional components) known in the art, such as a binding material, if necessary. As such binding material, a binding material used for an anode of a general lithium secondary battery may be employed appropriately. For example, the above-described materials used as the binding material for the cathode active material layer 34 may also be used appropriately in a selective manner.

(Non-Aqueous Electrolyte)

The non-aqueous electrolyte used in the lithium secondary battery 100 contains a non-aqueous solvent and a lithium salt serving as a supporting electrolyte (supporting salt) and also contains the specific compound represented by the formula (1) below (in the formula (1), M represents an element of the thirteenth, fourteenth or fifteenth group and another group, such as a halogen group, an alkyl group, alkoxy group, a cyano group or a hydroxyl group, may be bonded thereto depending on the valence; R represents $C_1$-$C_{10}$ alkylene, $C_1$-$C_{10}$ alkylene halide, $C_6$-$C_{20}$ arylene or $C_6$-$C_{10}$ arylene halide (a structure thereof may include a substituent and a hetero atom); and n represents 0 or 1).

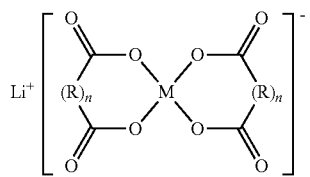

(1)

As a non-aqueous solvent, those known in the art may be used appropriately, and no particular limitation is placed on the kind. Examples of such non-aqueous solvent may include various organic solvents, more preferably, aprotic solvents, such as carbonates, esters, ethers, nitriles, sulfones and lactones. More specifically, it may be possible to use one kind or a combination of two or more kinds selected from among: carbonates such as ethylene carbonate (EC), propylene carbonate (PC), diethyl carbonate (DEC), dimethyl carbonate (DMC) and ethyl methyl carbonate (EMC); and those that may generally be used for an electrolyte for a lithium secondary battery, such as 1,2-dimethoxy-ethane, 1,2-diethoxy-ethane, tetrahydrofuran, 2-methyltetrahydrofuran, dioxane, 1,3-dioxolane, diethylene glycol dimethyl ether, ethylene glycol dimethyl ether, acetonitrile, prepionitrile, nitromethane, N,N-dimethylform-amide, dimethyl sulfoxide, sulfolane and γ-butyrolactone.

Further, specific examples of the lithium salt serving as a supporting electrolyte (supporting salt) may include various lithium salts known to be capable of functioning as a supporting electrolyte in an electrolyte for a lithium secondary battery, such as $LiPF_6$, $LiBF_4$, $LiN(SO_2CF_3)_2$, $LiN(SO_2C_2F_5)_2$, $LiCF_sSO_3$, $LiC_4F_9SO_3$, $LiC(SO_2CF_3)$ and $LiClO_4$: however, such lithium salt is not particularly limited thereto. Regarding a lithium salt, a single kind or a combination of two or more kinds may be used. From among those, in particular, $LiPF_6$ is preferably used. It should be noted that no particular limitation is placed on the concentration, in a non-aqueous electrolyte, of a lithium salt serving as a supporting electrolyte, and that such concentration may be set appropriately depending on the required performance. Such non-aqueous electrolyte can be composed as with the case of the non-aqueous electrolyte used in a conventional lithium secondary battery.

Specific examples of such specific compound represented by the formula (1) above may include a compound comprising boron (B) as M in the formula (1) and a compound comprising phosphorous (P) as M in the formula (1). Further specific examples thereof may include, preferably, LiBOB and LPFO, that is, the respective lithium salts represented by formulae (2) and (3) below, more preferably, LiBOB (formula (2)).

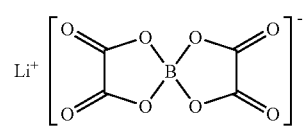

(2)

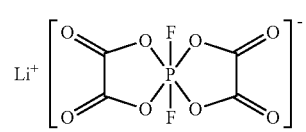

(3)

Regarding the content of such specific compound in a non-aqueous electrolyte, the initial content ratio relative to a capacitance of the anode is 0.04 to 0.5 [(mol/kg)/(mF/cm$^2$)], preferably 0.05 to 0.25 [(mol/kg)/(mF/cm$^2$)], Here, preferred examples of the capacitance of the anode may include, preferably, 0.09 (mF/cm$^2$) or higher, more preferably, 0.2 (mF/cm$^2$) or higher.

<Method of Manufacturing Non-Aqueous Electrolyte Secondary Battery>

(Cathode)

Next, a method of manufacturing a cathode of the lithium secondary battery 100 will be described. Firstly, the above-described cathode active material and, if necessary, the above-described self-sacrifice type auxiliary material for a cathode are provided, and such materials are mixed, stirred, etc., in a solid phase so as to prepare a mixture thereof. As a result, a mixture in which a self-sacrifice type auxiliary material adheres to at least a part of the surface of a cathode active material is obtained. Alternatively, a mixture in which a cathode active material has a surface which is coated with a self-sacrifice type auxiliary material with a uniform thickness may be obtained by using various types of conventional coating deposition methods, which may be used singly or in appropriate combination, such as a liquid phase method (crystallization method) of immersing a cathode active material in a solvent containing a self-sacrifice type auxiliary material and then drying (calcining) the resultant product and an evaporation method (gas phase method; a PVD method, such as a sputtering method, and a CVD method, such as a plasma CVD method).

Then, the obtained mixture of the cathode active material and the self-sacrifice type auxiliary material is mixed in an appropriate solvent, together with a conductive material, a binding material, etc., thereby preparing a pasty or slurry-like paste for forming a cathode active material layer. This paste is then applied onto the cathode assembly 32 (base material), and the resultant product is dried by volatilizing the solvent and is then compressed. As a result, a cathode of the lithium secondary battery 100 is obtained which comprises, on the cathode assembly 32, the cathode active material layer 34 formed using the above paste.

As the solvent used to prepare the above-described paste for forming a cathode active material layer, either a water-borne solvent or a non-water-borne solvent may be used. The water-borne solvent is typically water. Further, it is sufficient for the water-borne solvent to show aquosity; that is, water or a mixed solvent containing water as its main constituent may be used preferably. As a solvent, other than water, which constitutes such mixed solvent, it is possible to appropriately and selectively use at least one kind or two or more kinds of organic solvents (lower alcohol, lower ketone, etc.) which may be mixed with water uniformly. Further, preferred examples of the non-water-borne solvent may include N-methyl-2-pylolidone (NMP), methyl ethyl ketone and toluene.

As a method of applying the above paste onto the cathode assembly 32, techniques similar to conventional methods may be employed appropriately. Examples of such method may include methods using appropriate coating applicators such as a slit coater, a dye water, a gravure coater and a comma coater. Further, when drying a solvent, air drying, hot air, low-humidity air, vacuum, infrared rays, far infrared rays and electron rays may be used singly or in appropriate combination. Moreover, as a compression method, conventional compression methods, such as roll pressing and plate pressing, may be employed. When attempting to control the relevant thickness, compression may be performed multiple times so as to attain a desired thickness by performing a thickness measurement with a thickness measuring device and also by controlling a pressure for pressing appropriately.

(Anode)

Next, a method of manufacturing an anode of the lithium secondary battery 100 will be described. Firstly, the above-described anode active material and, if necessary, the above-described self-sacrifice type auxiliary material for an anode are prepared, and such materials are mixed, stirred, etc., in a solid phase so as to prepare a mixture thereof. As a result, a mixture in which a self-sacrifice type auxiliary material adheres to at least a part of the surface of an anode active material is obtained. Alternatively, a mixture in which an anode active material has a surface which is coated with a self-sacrifice type auxiliary material with a uniform thickness may be obtained by using various types of conventional coating deposition methods, which may be used singly or in appropriate combination, such as a liquid phase method (crystallization method) of immersing an anode active material in a solvent containing a self-sacrifice type auxiliary material and then drying (calcining) the resultant product and an evaporation method (gas phase method; a PVD method, such as a sputtering method, and a CVD method, such as a plasma CVD method).

The obtained mixture of the anode active material and the self-sacrifice type auxiliary material is mixed in an appropriate solvent, together with a conductive material, a binding material, etc., thereby preparing a pasty or slurry-like paste for forming an anode active material layer. This paste is then applied onto the anode assembly 42 (base material), and the resultant product is dried by volatilizing the solvent and is then compressed. As a result, a cathode of the lithium secondary battery 100 is obtained which comprises, on the anode assembly 42, the anode active material layer 44 formed using the above paste.

As the relevant application, drying and compression methods, means and methods similar to the above-described cathode manufacturing method may be used. Further, it is preferable for an anode to be configured such that the capacitance thereof is 0.09 (mF/cm$^2$) or higher, more preferably, 0.2 (mF/cm$^2$) or higher, as stated above.

(Non-Aqueous Electrolyte)

The above-described lithium salt serving as a supporting electrolyte (supporting salt) is mixed, into the above-described appropriate non-aqueous solvent, at an appropriate concentration, and also, the specific compound represented by the formula (1) is mixed thereinto at the above-described content ratio, that is, such compound is mixed thereinto such that the initial content ratio relative to the capacitance of an anode is 0.04 to 0.5 [(mol/kg)/(mF/cm$^2$)], preferably 0.05 to 0.25 [(mol/kg)/(mF/cm$^2$)].

(Lithium Secondary Battery 100)

The above-manufactured anode (typically, the cathode sheet 30) having the cathode active material layer 34 containing a cathode active material and the above-manufactured cathode (typically, the anode sheet 40) having the cathode active material layer 44 containing a cathode active material are stacked and wound-up together with two separators 50, and the obtained wound-up electrode body 20 is crushed in the direction of a side surface thereof so as to be squashed and is thereby formed into a flat shape.

Then, the internal cathode collection terminal 37 and the internal anode collection terminal 47 are respectively connected to the cathode-active-material-layer non-formation part 36 of the cathode assembly 32 and the anode-active-material-layer non-formation part 46 of the anode assembly 42 by means of supersonic welding, resistance welding, etc., thereby establishing an electrical connection with the cathode sheet 30 or the anode sheet 40 of the flat-shaped electrode body 20 formed as described above. Subsequently, the thus-obtained electrode body 20 is housed in the case 10; the non-aqueous electrolyte prepared as described above is then filed thereinto; and the filling port is sealed, whereby the lithium secondary battery 100 in the present embodiment may be obtained.

There is no particular limitation on, for example, the structure, size and material (for example, being made of metal or a laminate coating) of the case 10 and the specific structure (wound-up (rolled-up) structure, laminated structure, etc.) of the electrode body 20 comprising, as its main components, a cathode and an anode.

According to the thus-configured lithium secondary battery 100 and the manufacturing method, the specific compound of the formula (1) contained in a non-aqueous electrolyte is reduced and decomposed, on the anode, by the anode active material that acts as a strong reducing agent in a state-of-charge, and the produced chemical species having high activity bond to one another, resulting in the formation of a coating consisting of a chemically stable compound (SEI; Solid electrolyte interface; as it were, a physical barrier that blocks the decomposition of a non-aqueous electrolyte). As a result, a reduction decompression reaction on the anode is suppressed, and this may contribute to the improvement of battery characteristics of the lithium secondary battery 100, such as the cycle characteristics and durability.

As described above, the initial content ratio (for example, the content ratio in a recipe of a non-aqueous electrolyte) of a specific compound relative to the capacitance of the anode in a non-aqueous electrolyte is controlled so as to have a value falling within the range of 0.04 to 0.5 [(mol/kg)/(mF/cm$^2$)], preferably, 0.05 to 0.25 [(mol/kg)/(mF/cm$^2$)]. Thus, a coating is grown so as to function as a sufficient physical barrier for the anode, and an unreacted specific compound may be prevented from being captured in such coating. Therefore, the anode can be protected sufficiently while the deterioration (reduction) of an apparent battery capacity due to the consumption of an amount of electricity by such unreacted specific compound during the operation (endurance operation) of the lithium secondary battery 100 can be suppressed.

With such configuration, the anode protecting effect due to a specific compound as well as the battery-capacity-deterioration suppressing effect are produced sufficiently, whereby the cycle characteristics and durability of the lithium secondary battery 100 can further be improved and also whereby the amount of addition of a specific compound to a non-aqueous electrolyte can be optimized; therefore, the economic efficiency can be raised while suppressing the increase of the material cost.

Further, in the lithium secondary battery 100, the anode capacitance is 0.09 (mF/cm$^2$) or higher, more preferably, 0.2 (mF/cm$^2$) or higher, and thus, the number of sites which undergo the deinsertion of lithium ions in the anode active material can be prevented effectively from being reduced to an inconvenient level. As a result, the deterioration of the battery characteristics of the lithium secondary battery 100, such as the output characteristics, is suppressed while suppressing the increase of the reaction resistance in the anode, whereby a higher output can be maintained for a longer period than ever.

EXAMPLES

The present invention will be further described below in more detail with reference to Examples and Comparative Examples. However, the present invention is not limited to these Examples.

Comparative Example 1

The lithium secondary battery of Comparative Example 1 was provided having a configuration identical to that of the lithium secondary battery 100 shown in FIGS. 1 and 2 except that the specific compound represented by the formula (1) is not contained in a non-aqueous electrolyte.

Examples 1 to 6 and Comparative Examples 2 to 4

The lithium secondary batteries 100 of Examples 1 to 6 and the lithium secondary batteries of Comparative Examples 2 to 4 were manufactured in the same way as Comparative Example 1 except that a non-aqueous electrolyte obtained by adding, to the non-aqueous electrolyte in Comparative Example 1, a predetermined amount of LiBOB, being the specific compound represented by the formula (1), was used in place of the non-aqueous electrolyte in Comparative Example 1.

The measurement and evaluation (described below) result on an initial LiBOB content ratio relative to an anode capacitance regarding each of Examples and Comparative Examples is shown, in Table 1, as the "LiBOB content ratio [(mol/kg)/(mF/cm$^2$)]," Table 1 further shows, regarding each of Examples and Comparative Examples, the "anode active material BET specific surface area (m$^2$/g)," "density (g/cm$^3$)" of a non-aqueous electrolyte and "LiBOB content (mol/kg)," which were measured and evaluated by known methods, as well as the "anode capacitance (mF)," "reactive resistance (mΩ)" and "capacity maintenance factor (%)" of a lithium secondary battery, which were measured and evaluated as described below.

TABLE 1

|  | Anode Active Material BET Specific Surface Area (m$^2$/g) | Density (g/m$^3$) | LiBOB Content (mol/kg) | Anode Capacitance (mF/cm$^2$) | LiBOB Content Ratio [(mol/kg)/ (mF/cm$^2$)) | Reactive Resistance (mΩ) | Capacity Maintenance Factor (%) |
|---|---|---|---|---|---|---|---|
| Comparative Example 1 | 3.7 | 1.1 | 0.00 | 0.22 | 0.000 | 65 | 84 |
| Comparative Example 4 | 5.0 | 1.4 | 0.02 | 2.01 | 0.010 | 82 | 78 |
| Example 6 | 5.0 | 1.1 | 0.02 | 0.61 | 0.033 | 90 | 90 |
| Example 1 | 3.7 | 1.1 | 0.01 | 0.22 | 0.046 | 86 | 89 |
| Example 2 | 3.7 | 1.1 | 0.015 | 0.22 | 0.068 | 95 | 90 |
| Example 3 | 3.7 | 1.1 | 0.02 | 0.22 | 0.091 | 104 | 90 |
| Example 5 | 2.7 | 1.1 | 0.02 | 0.09 | 0.222 | 140 | 89 |
| Example 4 | 3.7 | 1.1 | 0.05 | 0.22 | 0.227 | 149 | 91 |
| Comparative Example 3 | 2.0 | 1.1 | 0.02 | 0.04 | 0.500 | 254 | 86 |
| Comparative Example 2 | 3.7 | 1.1 | 0.15 | 0.22 | 0.682 | 280 | 85 |

[Measurement and Evaluation Method]

(Anode Capacitance)

Figure 7:
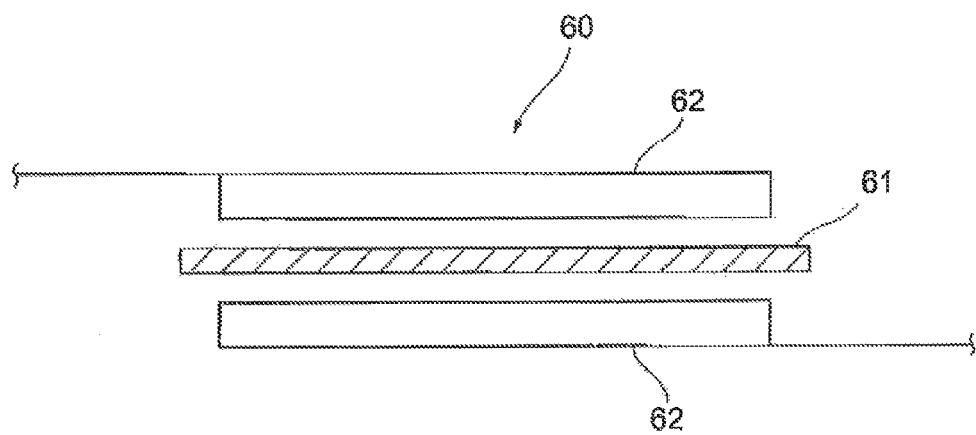
FIG. 7 is a schematic diagram illustrating the structure of a symmetric cell for measuring and evaluating an anode capacitance of a lithium secondary battery.

Using the same anode in an uncharged state as that used in each of Examples and Comparative Examples, a symmetry cell 60 having the structure schematically shown in FIG. 7 was manufactured. As shown in the same figure, the symmetry cell 60 is configured such that two anodes 62, 62 are arranged to be opposed to each other with a separator 61 sandwiched therebetween. A non-aqueous electrolyte comprised of a predetermined mixed solvent (EC/DMC/EMC=1/1/1) containing LiPF$_6$ at a concentration of 1M therein was filled in the cell. Each of the anodes 62 had an electrode surface area (one side) was 21.15 cm$^2$.

With the use of the symmetry cell 60 conforming to each of Examples and Comparative Examples, the quantitative value of an impedance Z (f) obtained with respect to a frequency within a predetermined range based on the measurement of the AC impedance characteristics at 25° C. was converted to an electric double capacity component C (f) with respect to such frequency within a predetermined range. Regarding C(f) obtained as above, the value obtained by dividing C'(f) at a frequency of 0.1 Hz by the above-mentioned electrode area (21.15 cm$^2$) of the anode 62 was the "anode capacitance." The anode capacitances concerning Examples and Comparative Examples are collectively shown in Table 1. It should be noted that: the anode is removed from the lithium secondary battery after charge of each of Examples and Comparative Examples; and the resultant lithium secondary battery is subjected to a CC discharge of 3 V (vs Li/Li$^+$) with Li as a counter electrode, thereby configuring the symmetry cell 60, and that the anode capacitance was then analyzed and measured/evaluated in the same way as above, as a result of which substantially the same data as above was obtained.

[Relational Expression 1]

$$Z(f) = Z'(f) + jZ''(f) \quad (4)$$

$$Z(f) = \frac{1}{j2\pi f \times C(f)} \Leftrightarrow C(f) = \frac{1}{j2\pi f \times Z(f)}$$

$$C(f) = \frac{1}{2\pi f \times (jZ(f) - Z''(f))} = -\frac{(Z''(f) + jZ'(f))}{2\pi f |Z(f)|^2} =$$

$$-\underbrace{\frac{Z''(f)}{2\pi f |Z(f)|^2}}_{C'(f)} - j\underbrace{\frac{Z'(f)}{2\pi f |Z(f)|^2}}_{C''(f)}$$

$$C'(f) = -\frac{Z''(\omega)}{\omega |Z(\omega)|^2} \quad C''(j) = \frac{Z'(\omega)}{\omega |Z(\omega)|^2}$$

(Capacitance Maintenance Factor)

Regarding the lithium secondary battery of each of Examples and Comparative Examples, the initial capacity and the capacity after a high-temperature storage endurance test (State of Charge (SOC): 80%, 60° C. and 30 days) were measured and the capacity maintenance factor was calculated from formula (5) below.

Capacity maintenance factor (%)=post-endurance-test capacity/initial capacity×100    (5)

The specific measurement conditions for such initial capacity and post-endurance-test capacity and the procedural steps are as follows:
(Conditions) temperature: 25° C., voltage range: 3.0 to 4.1 V
(Procedural Steps)
1. After 3.0 V is reached through a 1 C constant-current discharge, a constant voltage discharge is performed for 2 hours, and a pause of 10 seconds is then provided.
2. After 4.1 V is reached through a 1 C constant-current charge, a constant voltage charge is performed for 2.5 hours, and a pause of 10 seconds is then provided.
3. After 3.0 V is reached through a 0.5 C constant-current discharge, a constant voltage discharge is performed for 2 hours, and a pause of 10 seconds is then provided.
4. The discharge capacity ranging from the constant current discharge to the constant voltage discharge in Step 3 (Constant Current/Constant Voltage: CCCV discharge capacity) was the battery capacity.
(Reactive Resistance)
Regarding the lithium secondary battery of each of Examples and Comparative Examples, the AC impedance characteristic at low-temperature conditions (SOC: 40%, −30° C.) were measured. The diameter of the arc part of the obtained Cole-Cole plot was the reactive resistance.
(Coating Analysis)

The content of the specific compound of the formula (1) contained in the non-aqueous electrolyte of the lithium secondary battery, which is a non-aqueous electrolyte secondary battery, according to the present invention is specified by the initial content ratio (initial input) normalized by the anode capacitance, as stated above. When the lithium secondary battery is subjected to an initial charge, the specific compound is consumed, leading to the formation of a coating. In such lithium secondary battery in which a coating has been formed on an anode thereof, when, for example, LiBOB is used as the specific compound, the initial content ratio of LiBOB can be specified by performing (1) a quantitative analysis of boron contained in a coating, (2) an analysis of oxalate ions contained in a coating and (3) as quantitative analysis of LiBOB remaining in a non-aqueous electrolyte (excess solution), as follows:

(1) Quantitative Analysis of Boron in Coating

An anode taken out by disassembling a lithium secondary battery is cleaned, and the amount of boron per weight of the anode after cleaning is quantized by, for example, an induced coupling plasma (ICP) emission spectral analysis method. As a result, the boron content and the amount of LiBOB as the starting material can be evaluated in the unit of (μmol/cm$^2$), etc.

(2) Analysis of Oxalate Ions in Coating

Coating components are extracted from an anode taken out by disassembling a lithium secondary battery, using a water/acetonitrile mixed solution. Oxalate ions (which are produced through the decomposition of LiBOB) in the extracted components are then quantized by, for example, an ion chromatography (IC) method. As a result, the oxalate-ion content and the amount of LiBOB as the starting material can be evaluated in the unit of (μmol/cm$^2$), etc.

(3) Quantitative Analysis of LiBOB Remaining In Non-Aqueous Electrolyte (in Excess Solution)

A non-aqueous electrolyte is directly subjected to ion chromatography (IC), and the LiBOB concentration (for example, in the unit of (mmol/L) is measured and evaluated.

[Evaluation 1]

Figure 4:
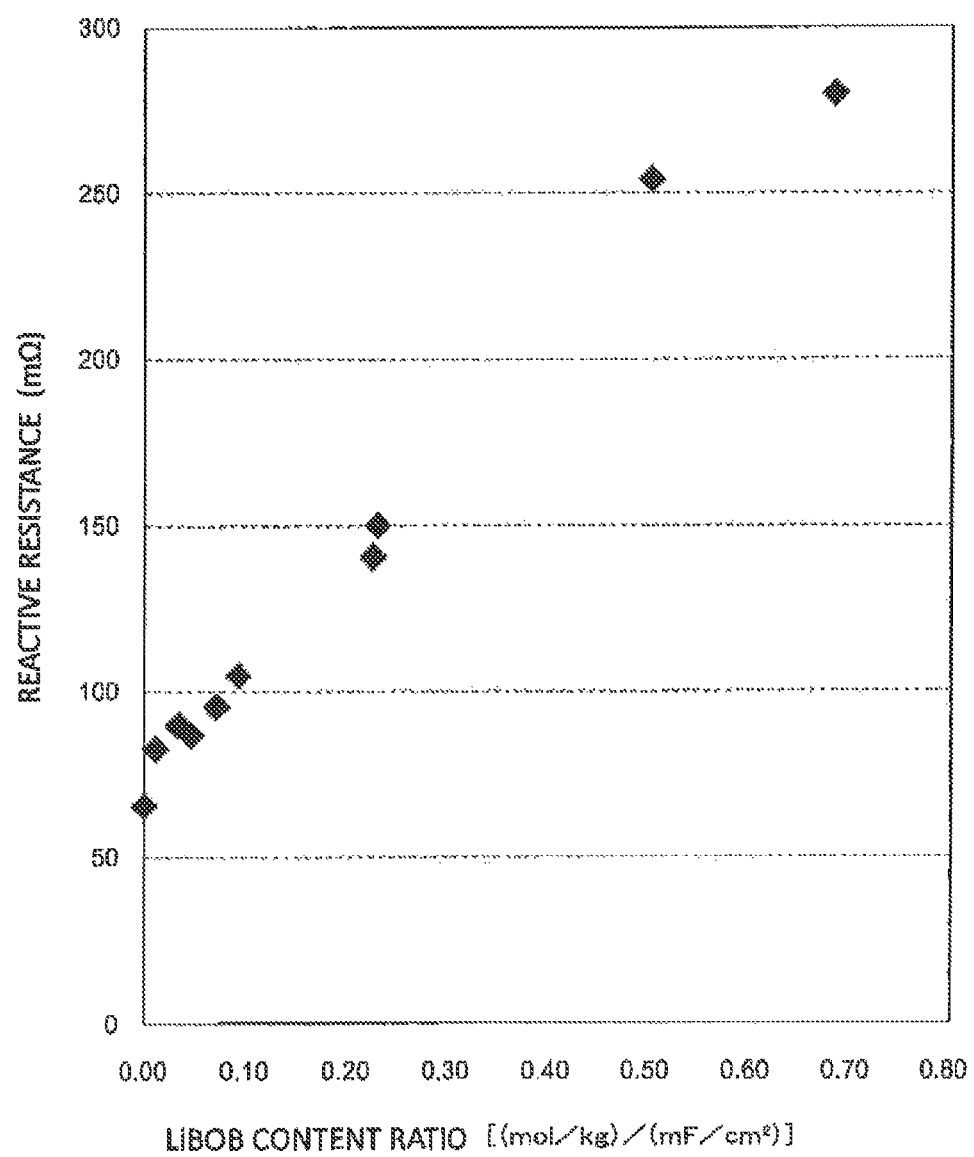
FIG. 4 is a graph in which the measurement result on a reactive resistance with respect to a LiBO content ratio is plotted regarding each of Examples and Comparative Examples.

FIG. 4 is a graph in which the measurement and evaluation result on a reactive resistance with respect to a LiBO content ratio is plotted regarding each of Examples and Comparative Examples. As shown in the same figure and Table 1, it has been confirmed that the content ratio of LiBOB in the non-aqueous electrolyte and the reactive resistance show a high correlation. This indicates that, as the LiBOB content ratio becomes higher, the coating thickness which is equivalent to the reactive resistance (an increase of the coating thickness leads to an increase of the electrical resistance) becomes greater linearly. From such respect, it can be appreciated that the reaction area of LiBOB in the anode has a high correlation (one-to-one correspondence) with the LiBOB content ratio normalized based on the anode capacitance.

[Evaluation 2]

Figure 5:
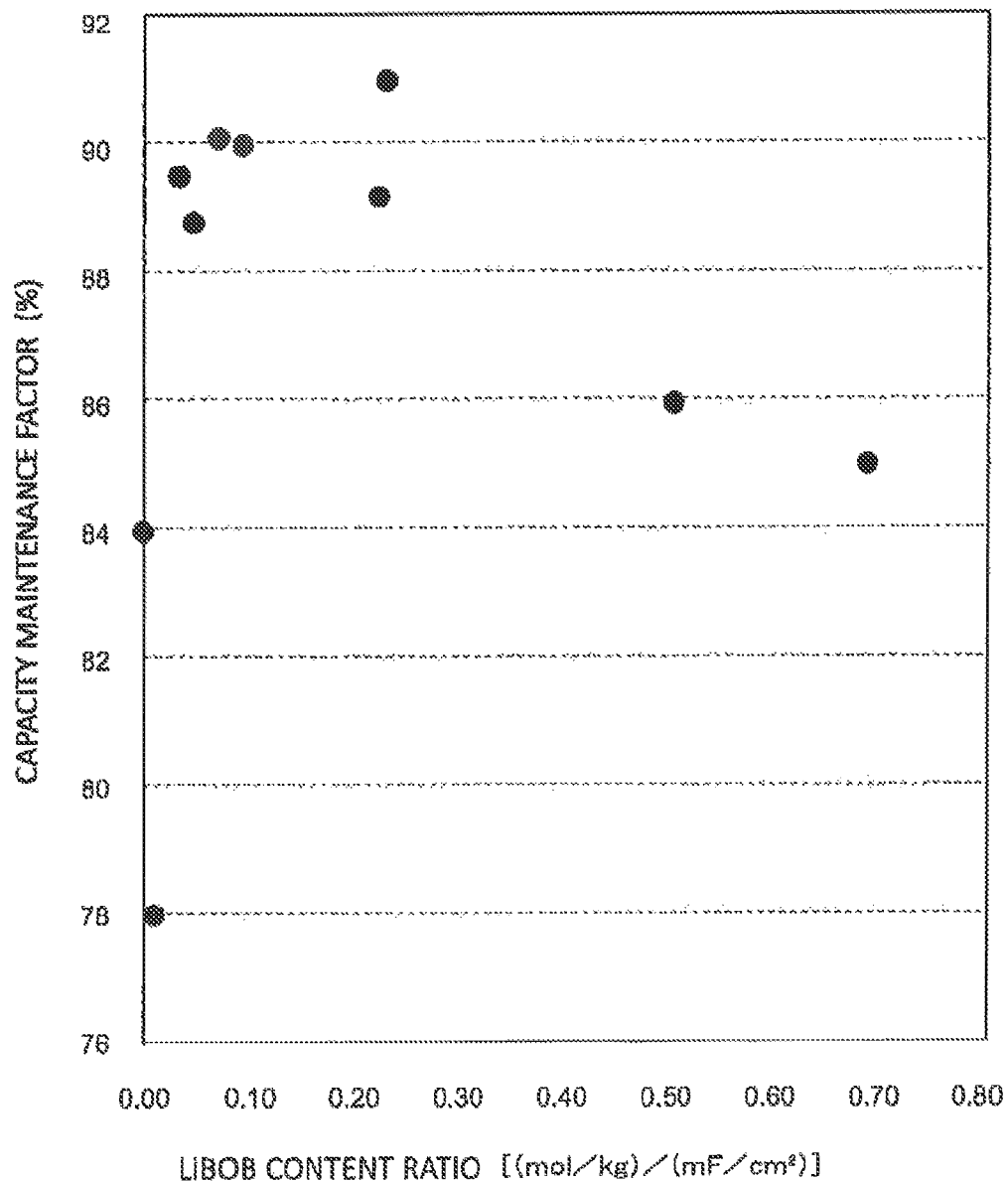
FIG. 5 is a graph in which the measurement and evaluation result on a capacitance maintenance factor with respect to a LiBO content ratio is plotted regarding each of Examples and Comparative Examples.

FIG. 5 is a graph in which the measurement and evaluation result on a capacitance maintenance factor with respect to a LiBO content ratio is plotted regarding each of Examples and Comparative Examples. As shown in the same figure and Table 1, it has been confirmed that a very high capacity maintenance factor can be achieved if the LiBOB content ratio in the non-aqueous electrolyte has a value falling within the above-described range of the present invention. For example, while the capacity maintenance factor of the lithium secondary battery in each of Comparative Examples is generally 85% or lower, a capacity maintenance factor of approximately 90% is attained in the lithium secondary battery 100 in each of Examples. Even a difference, by several percent, in such capacity maintenance factor results in a conspicuous difference in performance. A capacity maintenance factor higher by around 5% or higher in the case of Examples indicates a significant improvement in the cycle characteristics and durability.

Although not shown in the figures, as a result of the calculation, from the data shown in Table 1, the LiBOB content ratio relative to the BET specific surface area of the anode active material (that is the normalized value based on the BET specific surface area of the anode active material)

in each of Examples and Comparative Examples and the consideration of the calculated LiBOB content with respect to the capacity maintenance factor, no specific and unclear correlation or correspondence has been found between the two.

[Evaluation 3]

Figure 6:
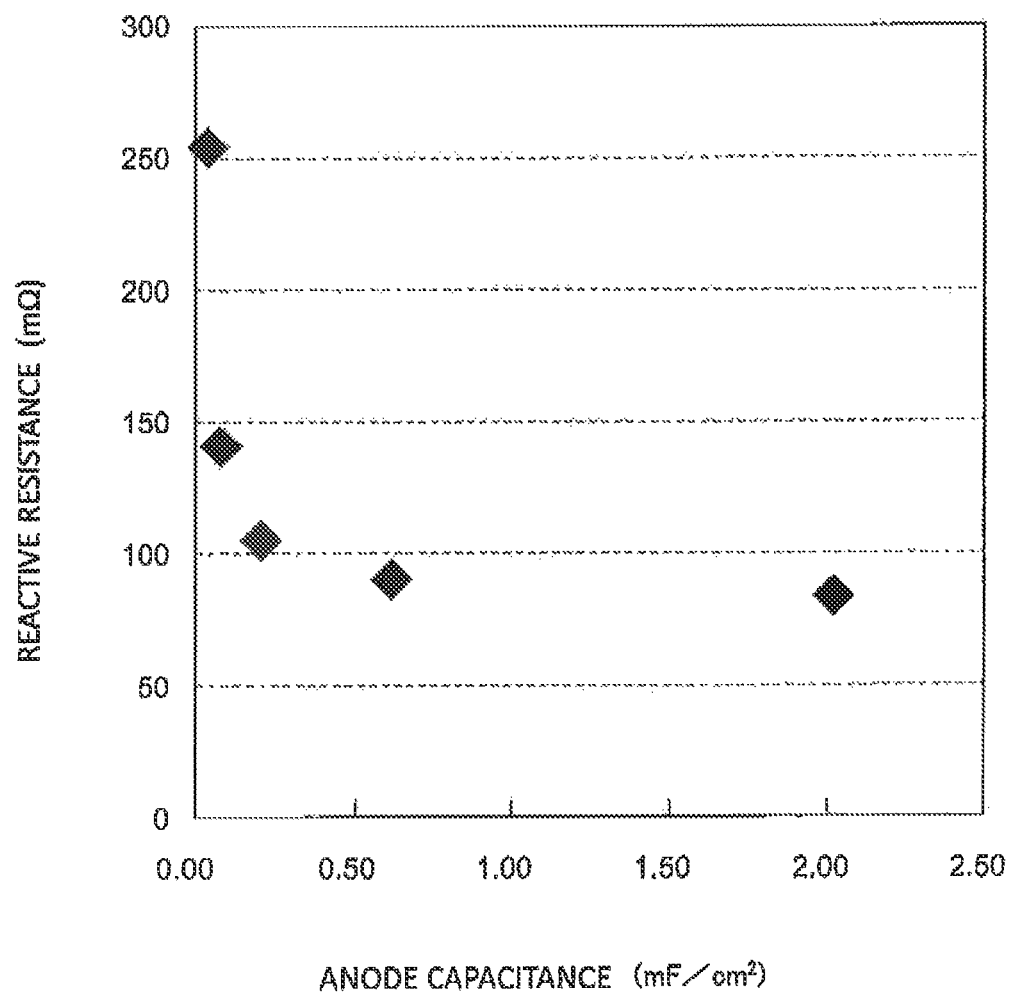
FIG. 6 is a graph in which the measurement and evaluation result on a reactive resistance with respect to an anode capacitance is plotted regarding each of Examples 3, 5 and 6 and Comparative Examples 3 and 4.

FIG. 6 is a graph in which the measurement and evaluation result on a reactive resistance with respect to an anode capacitance is plotted regarding each of Examples 3, 5 and 6 plus, for reference, Comparative Examples 3 and 4. As shown in the same figure and Table 1, it has been confirmed that, if the anode capacitance has a value falling within the above-described preferable range in the present invention, the reactive resistance can be suppressed sufficiently low (generally less than 150 (mΩ) in this measurement and evaluation).

It should be noted that, as discussed above, the present invention is not limited to the embodiment above and various modifications may be made without departing from the gist of the present invention.

INDUSTRIAL APPLICABILITY

As explained above, according to the present invention, since the specific compound represented by the formula (1) is contained, at an initial content ratio within a predetermined range, in a non-aqueous electrolyte, the anode protecting effect due to the specific compound as well as the battery-capacity-deterioration suppressing effect can be expressed sufficiently, whereby the cycle characteristics as well as the durability of a non-aqueous electrolyte secondary battery can further be improved, and further, since the amount of the addition of the specific compound to the non-aqueous electrolyte can be optimized, an increase in the material cost can be suppressed, thereby raising the economic efficiency. Accordingly, the present invention is widely and effectively applicable to vehicles in general provided with, as vehicle driving power sources, lithium secondary batteries, being non-aqueous electrolyte secondary batteries, schematically shown in, for example, FIG. 3 as well as to the manufacture thereof; etc.

DESCRIPTION OF REFERENCE NUMERALS

1: vehicle
10: battery case
12: opening
14: lid
20: wound-up electrode body
30: cathode sheet
32: cathode assembly
34: cathode active material layer
36: cathode-active-material-layer non-formation part
37: cathode collection terminal
38: external cathode collection terminal
40: anode sheet
42: anode assembly
44: anode active material layer
46: anode-active-material-layer non-formation part
47: anode collection terminal
48: external anode collection terminal
60: separator
60: symmetry cell
61: separator
62; anode
100; lithium secondary battery (non-aqueous electrolyte secondary battery)

What is claimed is:

1. A non-aqueous electrolyte secondary battery that is provided in a vehicle and is used as a power source for driving the vehicle, comprising;
a cathode containing a cathode active material; an anode containing an anode active material; and a non-aqueous electrolyte containing a lithium salt in a non-aqueous solvent,
wherein the non-aqueous electrolyte further contains a compound represented by formula (1) below:

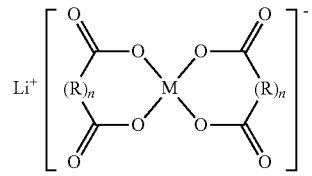
(1)

[where M represents an element of the thirteenth, fourteenth or fifteenth group and another group may be bonded thereto depending on a valence; R represents $C_1$-$C_{10}$ alkylene, $C_1$-$C_{10}$ alkylene halide, $C_6$-$C_{20}$ arylene or $C_8$-$C_{10}$ arylene halide (a structure thereof may include a substituent and a hetero atom); and n represents 0 or 1], and
wherein, in the non-aqueous electrolyte, an initial content of the compound relative to a capacitance of the anode is 0.04 to 0.5 [(mol/kg)/(mF/cm$^2$)].

2. The non-aqueous electrolyte secondary battery according to claim 1, wherein the capacitance of the anode is 0.09 (mF/cm$^2$) or higher.

3. The non-aqueous electrolyte secondary battery according to claim 1, wherein the compound represented by the formula (1) is a compound represented by formula (2) below:

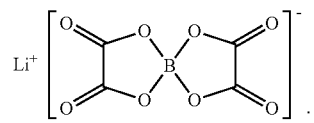
(2)

4. A method of manufacturing a non-aqueous electrolyte secondary battery that is provided in a vehicle and is used as a power source for driving the vehicle, the method comprising the steps of;
forming or providing a cathode containing a cathode active material;
forming or providing an anode containing an anode active material; and
preparing a non-aqueous electrolyte containing a lithium salt in a non-aqueous solvent,
wherein, in the step of preparing a non-aqueous electrolyte, a compound represented by formula (1) below:

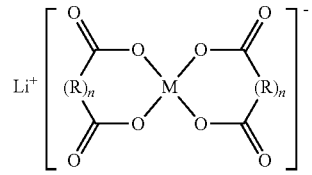
(1)

[where M represents an element of the thirteenth, fourteenth or fifteenth group and another group may be bonded thereto depending on a valence; R represents $C_1$-$C_{10}$ alkylene, $C_1$-$C_{10}$ alkylene halide, $C_6$-$C_{20}$ arylene or $C_8$-$C_{10}$ arylene halide (a structure thereof may include a substituent and a hetero atom); and n represents 0 or 1]

is added to the non-aqueous electrolyte such that an initial content of the compound relative to a capacitance of the anode has a value falling within a range of 0.04 to 0.5 [(mol/kg)/(mF/cm$^2$)].

5. The method of manufacturing a non-aqueous electrolyte secondary battery according to claim 4, wherein, in the step of forming or providing an anode, the capacitance of the anode is set to 0.09 (mF/cm$^2$) or higher.

6. The method of manufacturing a non-aqueous electrolyte secondary battery according to claim 4, wherein, as the compound represented by the formula (1), a compound represented by formula (2) below is used:

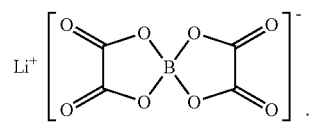
(2)

\* \* \* \* \*